United States Patent
Mauceri, Jr. et al.

(10) Patent No.: US 7,917,545 B2
(45) Date of Patent: Mar. 29, 2011

(54) WEB-BASED DATA FORM

(75) Inventors: Robert J. Mauceri, Jr., Seattle, WA (US); Simon S. Yun, Seattle, WA (US); Charles W. Parker, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 280 days.

(21) Appl. No.: 10/956,012

(22) Filed: Sep. 30, 2004

(65) Prior Publication Data

US 2006/0074981 A1 Apr. 6, 2006

(51) Int. Cl.
*G06F 7/00* (2006.01)
*G06F 17/30* (2006.01)
(52) U.S. Cl. .................................. 707/803; 715/221
(58) Field of Classification Search .................. 707/100, 707/1, 600, 803; 709/246; 715/221
See application file for complete search history.

(56) References Cited

U.S. PATENT DOCUMENTS

| | | | | |
|---|---|---|---|---|
| 5,299,305 | A * | 3/1994 | Oomae et al. | 715/506 |
| 5,774,887 | A * | 6/1998 | Wolff et al. | 707/1 |
| 6,795,868 | B1 * | 9/2004 | Dingman et al. | 709/246 |
| 6,820,135 | B1 * | 11/2004 | Dingman et al. | 709/246 |
| 7,117,227 | B2 * | 10/2006 | Call | 707/104.1 |

FOREIGN PATENT DOCUMENTS

CN 1395193 2/2003

OTHER PUBLICATIONS

Milosavljevic et al.; "*Automatic Code Generation for Database-Oriented Web Applications*"; p. 59-64; Principles and Practices of Programming in Java 2002.
Turau; "*A framework for automatic generation of web-based data entry applications based on XML*"; pp. 1121-1126; 2002.
Kassoff et al.; "*Creating GUIs for Web Services*"; pp. 66-73; Sep.-Oct. 2003; IEEE.
Yang et al.; "*CDI d deficiency exacerbates inflammatory dermatitis in MRL-lpr/lpr mice*"; pp. 1723-1732; 2004.
Qualls, M.; "*Editing XML with XSL and ASP*"; Dec. 9, 2002; XP002475464.
Notice of First Office Action dated Apr. 11, 2008, in CN Appl. No. 200510099656.4, with translation.
Notice of Second Office Action dated Oct. 11, 2008, in CN Appl. No. 200510099656.4, with translation.

* cited by examiner

*Primary Examiner* — John Breene
*Assistant Examiner* — Joshua Bullock
(74) *Attorney, Agent, or Firm* — Merchant & Gould

(57) ABSTRACT

A web-based data form enables modifications made to values in the data form to be dynamically implemented in a data source. Form fields of the data form are associated with items in the data source using data binding information. Data from the data source is transformed into intermediate code using Extensible Stylesheet Language Transformation (XSLT) code. Form controls of the data form are instantiated using the intermediate code. Hypertext Markup Language (HTML) is generated from the intermediate code including the form controls.

16 Claims, 4 Drawing Sheets

WEB-BASED DATA FORM

BACKGROUND OF THE INVENTION

Data forms are a fundamental component of building web-based applications. Data forms provide an interface for end users to contribute information to an application and to control the information received from the application. A data form is a section of a document containing normal content, markup, special elements called form controls (e.g., checkboxes, radio buttons, menus), and labels on the controls. Users generally complete a data form by modifying the form controls (e.g., entering text, selecting menu items) before submitting the data form for processing (e.g., to a web server or a mail server).

Each form control has both an initial value and a current value. A form control's initial value may be specified with a value associated with the form control. The form control's current value is first set to the initial value. Thereafter, the form control's current value may be modified through user interaction. A form control may have a field name paired with the current value such that when a form control is submitted for processing the field name and the current value of the form control are also submitted. Data views provide display functionality such that a user may view dynamic data from a data source. However, the user's interaction with the dynamic data is limited to read-only functionality with the data source.

SUMMARY OF THE INVENTION

A web-based data form enables modifications made to values in a data form to be dynamically reflected in a data source. Form fields of the data form are associated with records in the data source using data binding information. Data from a data source (e.g., an Extensible Markup Language (XML) file, a web service, or a database) is transformed into intermediate code using an Extensible Style Language Transform (XSLT). In one embodiment, the intermediate code is compatible with ASP.NET functionality developed by the Microsoft Corporation of Redmond, Washington. Form controls of the data form are instantiated using the intermediate code. Hypertext Markup Language (HTML) is generated from the intermediate code including the instantiated form controls.

A data binding process maintains the relationship between the data form and the corresponding records in the data source such that modified values in the data form may be updated in the data source. When a user modifies the form field values, the modifications are posted back to a server. Evaluation of the XSL transform creates form controls corresponding to fields in the data source and obtains data binding information associated with the form controls. The data binding information is used to compare data in the data form to data associated with an item in the data source to determine the changed values. The item corresponding to the modified form fields is updated with the changed values using the data binding information.

DETAILED DESCRIPTION OF THE PREFERRED EMBODIMENT

A web-based data form enables modifications made to values in the data form to be dynamically implemented in a data source. Form fields of the data form are associated with items in the data source using data binding information. Data from a data source, such as an Extensible Markup Language (XML) file, associated with a requested web page is transformed into intermediate code using an Extensible Stylesheet Language Transform (XSLT). In one embodiment, the intermediate code is compatible with ASP.NET functionality developed by the Microsoft Corporation of Redmond, Wash. Form controls of the data form are instantiated using the intermediate code. Hypertext Markup Language (HTML) is generated from the intermediate code including the instantiated form controls.

A data binding process maintains the relationship between the data form and the corresponding items in the data source such that modified values in the data form may be updated in the data source. When a user modifies the form field values, the modifications are posted back to a server. Evaluation of the XSL transform creates form controls corresponding to the items in the data source and obtains data binding information associated with the form controls. The data binding information is used to compare data in the data form to data associated with an item in the data source to determine the changed values. The item corresponding to the modified form fields is updated with the changed values using the data binding information.

Illustrative Operating Environment

Figure 1:
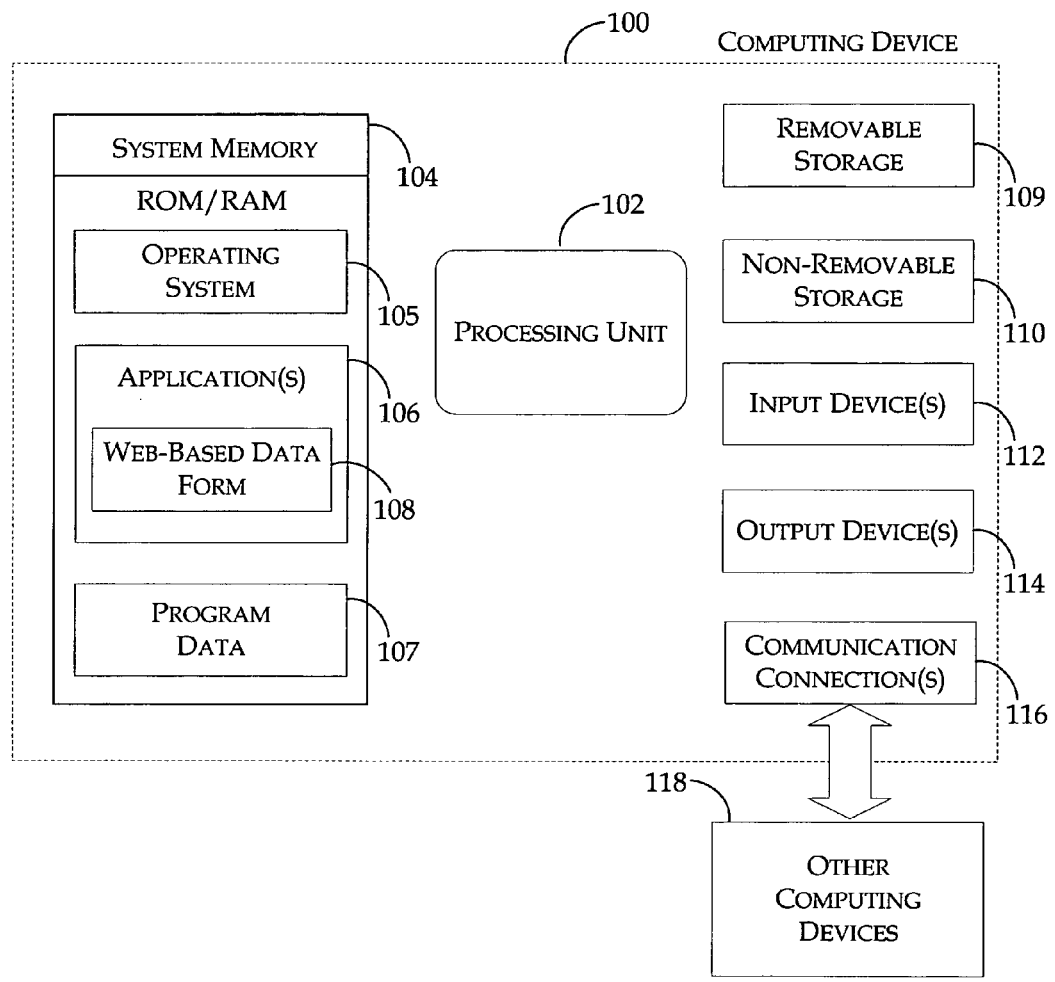
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A web-based data form 108, which is described in detail below, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Web-Based Data Forms

Figure 2:
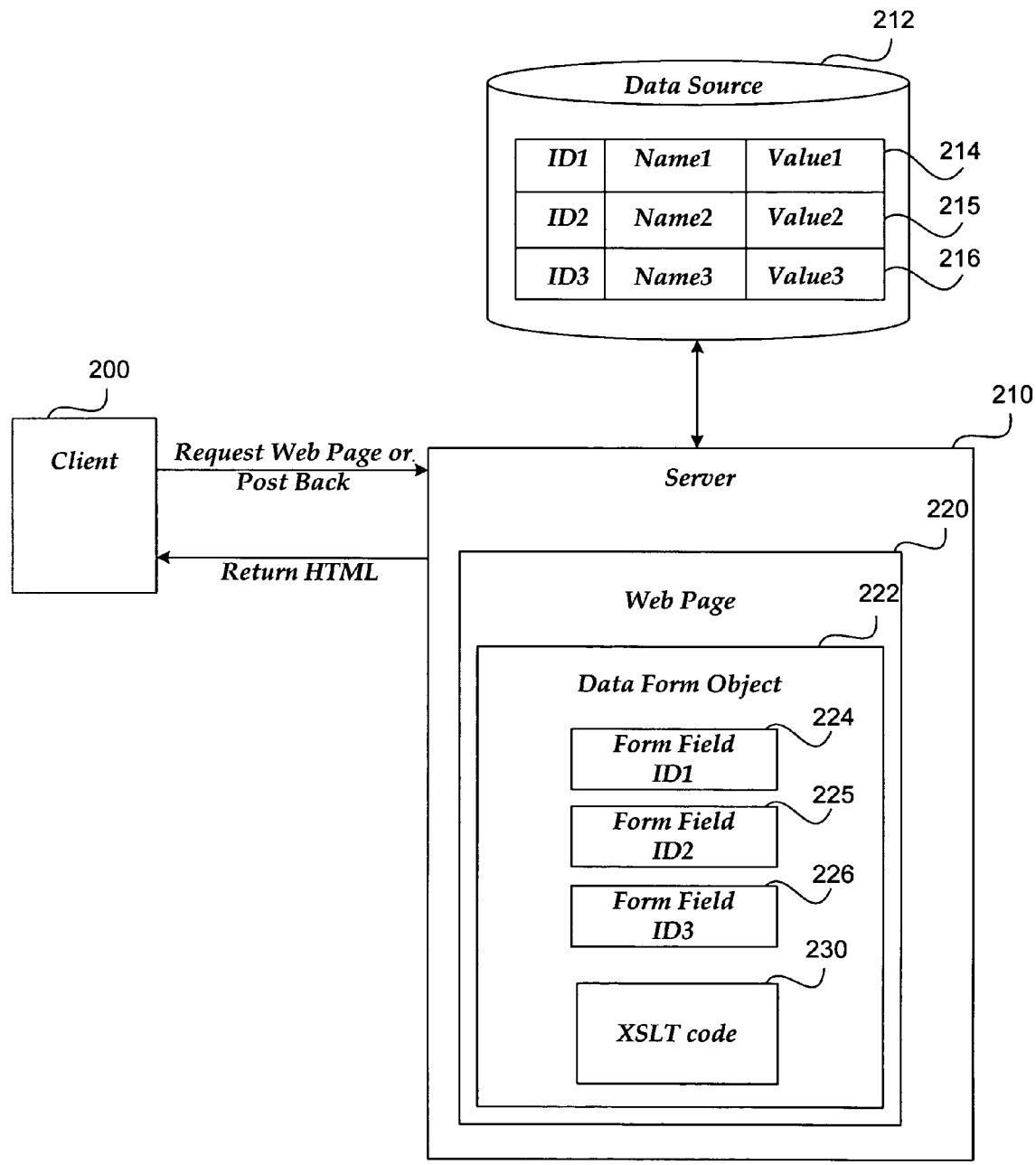
FIG. 2 illustrates a block diagram of a system for displaying a web page and updating modified data associated with the web page in a data source, in accordance with the present invention.

FIG. 2 illustrates a block diagram of a system for displaying a web page and updating modified data associated with the web page in a data source. The system includes a client 200, a server 210, and a data source 212. Data source 212 includes records 214, 215, 216. Server 210 includes web page 220. Web page 220 includes data form object 222. Data form object 222 can be a single record form or a multi-record form. The single record form can be used to add a new record to data source 212, and to edit or delete an existing record. The multi-record form allows for editing multiple records in data source 212 simultaneously. A multi-record form can present data items in a form with edit controls that update specific items in several records in data source 212.

Data form object 222 includes form fields 224, 225, 226 and XSLT code 230. Each form field 224, 225, 226 stores a value and is associated with a form control. The value may be a value entered by a user, a default value, a value from data source 212, or an empty value. Examples of form fields 224, 225, 226 include a text box, a drop down menu, a calendar, a date, or any other object-oriented form control. The form control is code that provides functionality for viewing, deleting, updating, and inserting values in form fields 224, 225, 226. The form control is extensible such that the code can be modified to customize the form control for a specific use. For example, a form field corresponding to a social security number can be formatted to display three fields separated by a dash. Some form fields are associated with more than one form control. For example, a date form field may have one form control for the day, another form control for the month, and yet another form control for the year.

Each form field 224, 225, 226 corresponds to a data field within record 214, 215, 216 in data source 212. Data source 212 may be tabular (e.g. a database) or hierarchical (e.g., an XML file). Record 214 includes data binding information associated with form field 224 including identifier (ID1), name of the form field (Name1), and the original value (Value1) entered in the form field. The data binding information is also stored in data form object 222. The data binding information maintains the relationship between form fields 224, 225, 226 of data form object 222 and corresponding records 214, 215, 216 in data source 212.

The form controls are instantiated when a user requests a web page for the first time. Client 200 requests web page 220 from server 210. Server 210 calls to data form object 222 to request data from data source 212 as specified by data form object 222. XSLT code 230 of data form object 222 includes a list of markup commands that provide instructions on how to transform XML data associated with foini fields 224 to obtain the corresponding form controls. Server 210 uses XSLT code 230 of data form object 222 to transform XML data associated with the requested web page. Intermediate code is generated from the XSL transformation. The intermediate code includes formatting information for the form controls. In one embodiment, the intermediate code is compatible with ASP.NET functionality developed by the Microsoft Corporation of Redmond, Wash. Server 210 sends the intermediate code associated with the requested XSLT code to data form object 222.

Data form object 222 instantiates the form controls associated with form fields 224, 225, 226 within the intermediate code such that the current values of the form controls are generated. The data binding information associated with the instantiated form controls is stored in data form object 222. Server 210 processes the intermediate code with the instantiated form controls into Hyper Text Markup Language (HTML). Server 210 then returns the HTML to client 200 for display in a web browser.

A post back occurs when a user submits a data form to server 210 with a modified value associated with form fields 224, 225, 226. In one embodiment, the user submits the data form by activating a button on the data form. The data binding information of the previous, unmodified form control is available from form fields 224, 225, 226 of data form object 222. The modified form values are available upon post back. The form controls are expanded to include the modified values by evaluating the XSLT code associated with the form controls. The form controls are expanded in accordance with the form control instantiation process described above. The expanded form control values are stored in server 210 along with data binding information that associates the form controls of form fields 224, 224, 226 with records 214, 215, 216 in data source 212.

As part of the post back process, server 210 calls an event handler to determine which form controls have been modified. The event handler compares the data binding information associated with the expanded form controls in data form object 220 to the data binding information associated with the previous form controls in records 214, 215, 216 of data source 212. Data source 212 is then updated to include the modifications. The data items corresponding to the modified form fields may be updated with the changed values using the data binding information. The data binding information allows multiple data items to be updated. In one embodiment, multiple data items are updated simultaneously. In another embodiment, multiple data items are updated in a transacted manner such that failure to update one data item prevents the other data items from being updated. The items in data source 212 may be changed in ways other than updating modified values. For example, new values may be inserted into an item, a new item may be created, or an obsolete item may be deleted.

Figure 3:
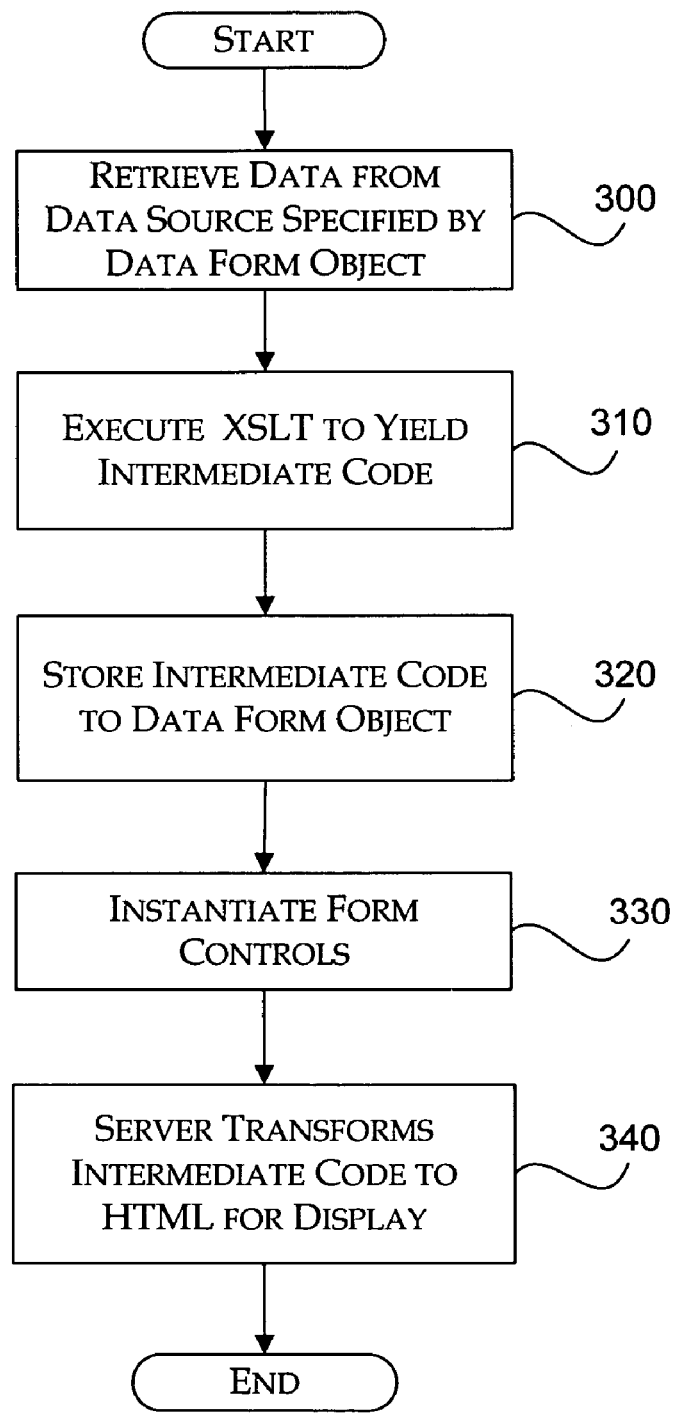
FIG. 3 is an operational flow diagram illustrating a process for instantiating form controls in a data form object when a web page is requested for the first time, in accordance with the present invention.

FIG. 3 is an operational flow diagram illustrating a process for instantiating form controls in the data form object when a web page is requested for the first time. Modifications to the form fields cannot be determined until the form controls are established. The process begins at a start block where a request is made to obtain a web page from a server. In one embodiment, if the web page has not yet been requested by the browser (i.e., first fetch) the form controls have not yet been established because the XSL transformation has not been executed.

Moving to block 300, the server retrieves data from the data source specified by the data form object associated with the requested web page. The data form object includes the XSLT code associated with the requested web page. The XSLT code includes a list of markup commands that provide instructions on how to transform XML data associated with the form fields to obtain the corresponding form controls.

Proceeding to block 310, the server executes the XSLT code to transform XML data associated with the requested web page into intermediate code (e.g., an ASP.NET file). The intermediate code includes formatting information associated with the form controls. Advancing to block 320, the intermediate code is stored in the data form object.

Continuing to block 330, the form controls are instantiated such that current values of the form controls are generated. Transitioning to block 340, the server transforms the intermediate code with the instantiated form controls to HTML for display in a web browser. Processing then terminates at an end block.

Figure 4:
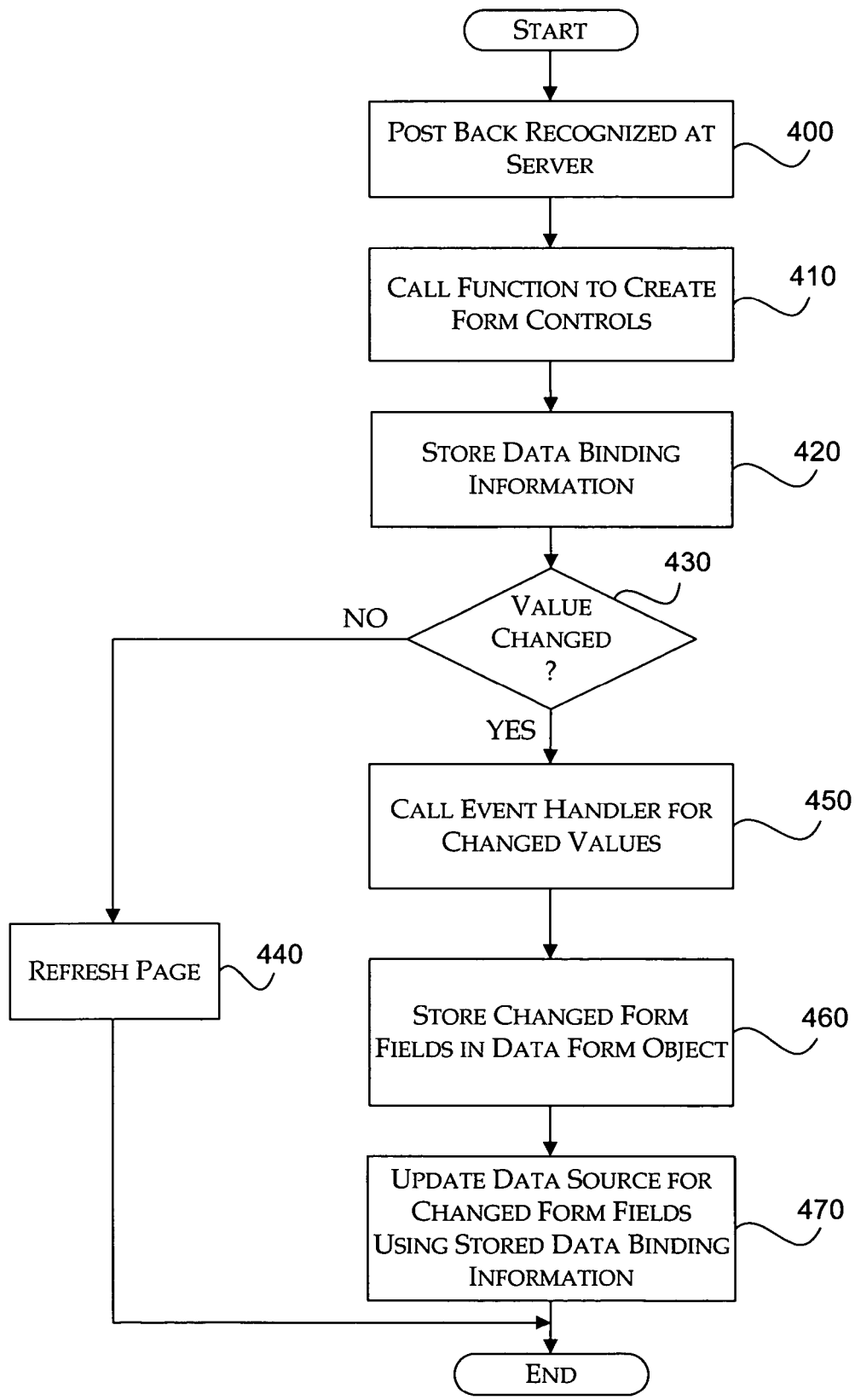
FIG. 4 is an operational flow diagram illustrating a process for updating an item in the data source, in accordance with the present invention.

FIG. 4 is an operational flow diagram illustrating a process for updating a record in a data source when a data form is modified (i.e., post back). The process begins at a start block where a post back is initiated when a data form is submitted to the server with at least one modification.

Moving to block 400, the server recognizes that a post back has been submitted. Modifications to form controls may be submitted by entering new values in the form fields and then clicking a "save" button on the web page. In one embodiment, intermediate updates may be buffered until the user invokes a final update command to submit the post back to the server.

Proceeding to block 410, a function is called to create form controls. The form control creation process is similar to the process for instantiating the form controls as described with reference to FIG. 3 (i.e., evaluating the XSLT code associated with the form controls). The form controls are created such that current data binding information is generated to reflect the modified form fields.

Advancing to block 420, the data binding information associated with the modified form fields is stored in the server. The data binding information includes the form field identifier, the name of the form field, and the value of the form field.

Transitioning to decision block 430, a determination is made if the value of the form field has changed. The data binding information is used to compare data in the data form to data associated with a data item in the data source to determine the changed values. In one embodiment, the value stored in the data source may be a previously stored value such that the modification is implemented by updating an old value. In another embodiment, the value stored in the data source may be a default/empty value such that the modification is implemented by inserting a new value. In yet another embodiment, the value stored in the data source may be a previously stored value and the value stored in the data form object may be empty such that the modification is implemented by deleting an old value. If the value of the form field has been modified, processing advances to block 450. If the value of the form field has not been modified, processing proceeds to block 440 where the web page is refreshed in the browser, and processing terminates at an end block.

Continuing to block 450, an event handler is called when form field values are changed. The event handler processes user updates to the data form object for insert, update, and delete operations. The event handler compares the data binding information associated with the expanded form controls with the previous form controls to determine the modifications made to the form fields. Processing proceeds to block 460 where the changed form fields are stored in the data form object.

Moving to block 470, the data source is updated for the changed form fields using the stored data binding information. Updates may be made to one item in the data source or to a group of items. The update may insert a new item or delete an existing item. The update may also allow repeating data to be entered into different items. Processing then terminates at the end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for processing a web-based data form that comprises web page form fields that are associated with form controls, comprising:

associating the form controls with the web page form fields; wherein each web page form field is bound to a different data field within a record in the data source; wherein the record in the data source stores data binding information that maintains a relationship between each of the web page form fields and corresponding form fields; wherein the data binding information for each form control includes an identifier for identifying the control and the field, a name of the form field, and a value of the form field that is stored in the form field;

instantiating each of the form controls when a web page comprising the form controls is first requested; wherein each of the form controls includes form control code that provides functionality for viewing, deleting, updating, and inserting values in the web page form fields; wherein each of the form controls is instantiated using the value of the form field that is stored within the associated field of the data source; wherein the value for each of the web form fields is retrieved from the data source when the form controls are instantiated;

receiving a new value in one of the web page form fields for one of the form controls;

generating current data binding information for the web page form field and the form control receiving the new value;

determining when the value of the form field has changed by comparing the current data binding information associated with the form control to the data binding information in the record of the data source; and when the value has changed, storing the changed form field in the web-based data form and updating the data source for the changed form field using the current data binding information.

2. The computer-implemented method of claim 1, further comprising:

receiving a request to retrieve a web page associated with the data form.

3. The computer-implemented method of claim 2, wherein instantiating the controls comprise processing Extensible Stylesheet Language Transformation (XSLT) code and Extensible Markup Language (XML) data associated with the data source into intermediate code.

4. The computer-implemented method of claim 3, further comprising:
- transforming Extensible Markup Language (XML) data associated with the data source into intermediate code using Extensible Stylesheet Language Transformation (XSLT) code associated with the data form;
- associating data binding information associated with the control reflects the modified control;
- processing the intermediate code into Hypertext Markup Language (HTML) using the new control; and
- displaying a web page using the Hypertext Markup Language (HTML).

5. The computer-implemented method of claim 4, further comprising determining which modifications were made to the control by using the data binding information to compare data associated with the control of the data form with the field of the data source.

6. The computer-implemented method of claim 1, wherein storing the modifications to the control in the field of the data source further comprises updating the field in the data source.

7. The computer-implemented method of claim 1, wherein storing the modifications to the control in the field of the data source further comprises inserting a new field in the data source.

8. The computer-implemented method of claim 1, wherein storing the modifications to the control in the field of the data source comprises deleting the field in the data source.

9. A system for processing a web-based data form, comprising:
- a server that is arranged to provide a web page associated with the data form, wherein the data form comprises controls; wherein each of the controls comprise a web page form field; wherein each of the controls include form control code that provides functionality for viewing, deleting, updating, and inserting a value in the web page form field; wherein each of the controls is instantiated based on a current value that is obtained from a data source comprising fields; wherein the data source stores data binding information that maintains a relationship between each of the web page form fields of the data form and corresponding fields of the data source; wherein the data binding information for each control includes an identifier for identifying the control and the field, a name of the form field, and a value of the form field that is stored in the form field;
- receiving a new value in one of the web page form fields for one of the controls;
- generating current data binding information for the web page form field and the control receiving the new value;
- determining when the value of the form field has changed by comparing the current data binding information associated with the control to the data binding information in the record of the data source; and when the value has changed, storing the changed form field in the web-based data form and updating the data source for the changed form field using the current data binding information.

10. The system of claim 9, wherein the server is further arranged to instantiate the control by:
- processing Extensible Stylesheet Language Transformation (XSLT) code associated with the data form into intermediate code;
- retrieving Extensible Markup Language (XML) data associated with the data source; and
- generating the control from the intermediate code and the Extensible Markup Language (XML) data.

11. The system of claim 10, wherein the server is further arranged to:
- transform Extensible Markup Language (XML) data associated with a requested data source into intermediate code using Extensible Stylesheet Language Transformation (XSLT) code associated with the data form;
- associate data binding information associated with the new control reflects the modified control;
- process the intermediate code into Hypertext Markup Language (HTML) using the new control; and
- display the web page using the Hypertext Markup Language (HTML).

12. The system of claim 11, wherein the server is further arranged to determine which modifications were made to the control by using the data binding information to compare data associated with the control of the data form with the field of the data source.

13. A tangible computer-readable storage medium having computer-executable instructions for processing a web-based data form, comprising:
- receiving a request to retrieve a web page associated with the data form; and
- instantiating a control of the data form, wherein the control includes form control code that provides functionality for viewing, deleting, updating, and inserting values in the data form; wherein the control is instantiated based on a current value that is obtained from a data source, wherein the data source stores data binding information that maintains a relationship between the data form and corresponding field of the data source; wherein the data binding information for each control includes an identifier for identifying the control and the field, a name of the form field, and a value of the form field that is stored in the form field; receiving a new value in one of the web page form fields for one of the form controls;
- which comprises a web page form field, by:
  - processing Extensible Stylesheet Language Transformation (XSLT) code associated with the data form into intermediate code;
  - retrieving Extensible Markup Language (XML) data associated with the data form;
  - generating the control from the intermediate code and the Extensible Markup Language (XML) data;
- receiving a new value in one of the web page form fields for one of the controls;
- generating current data binding information for the web page form field and the control receiving the new value;
- determining when the value of the form field has changed by comparing the current data binding information associated with the control to the data binding information in the record of the data source; and when the value has changed, storing the changed form field in the web-based data form and updating the data source for the changed form field using the current data binding information.

14. The computer-readable medium of claim 13, further comprising:
- generating data binding information associated with the new control of the data form and a field in a data source, associating the new control of the data form with the field in the data source using the data binding information.

15. The computer-readable medium of claim 14, further comprising:

transforming Extensible Markup Language (XML) data associated with the requested web page into intermediate code using Extensible Stylesheet Language Transformation (XSLT) code associated with the data form;

associating data binding information associated with the control detects the new control;

processing the intermediate code into Hypertext Markup Language (HTML) using the regenerated control; and displaying the web page using the Hypertext Markup Language (HTML).

16. The computer-readable medium of claim 15, further comprising determining which modifications were made to the control by using the data binding information to compare data associated with the control of the data form with the field of the data source.

* * * * *